(12) United States Patent
Martinez et al.

(10) Patent No.: US 8,838,134 B2
(45) Date of Patent: Sep. 16, 2014

(54) METHOD AND COMPUTER PROGRAMS FOR THE CONSTRUCTION OF COMMUNTING MATRICES USING CALL DETAIL RECORDS AND A USE FOR PROVIDING USER'S MOBILITY INFORMATION

(75) Inventors: Enrique Frias Martinez, Madrid (ES); Vanessa Frias Martinez, Madrid (ES)

(73) Assignee: Telefonia, S.A., Madrid (ES)

( * ) Notice: Subject to any disclaimer, the term of this patent is extended or adjusted under 35 U.S.C. 154(b) by 81 days.

(21) Appl. No.: 13/554,465

(22) Filed: Jul. 20, 2012

(65) Prior Publication Data

US 2014/0024389 A1 Jan. 23, 2014

(51) Int. Cl.
*H04W 4/02* (2009.01)

(52) U.S. Cl.
USPC .............. 455/456.1; 455/435.1; 455/456.3; 342/451

(58) Field of Classification Search
USPC ............ 455/404.2, 405, 414.1, 422.1, 455/456.1–457, 435.1–435.3
See application file for complete search history.

(56) References Cited

U.S. PATENT DOCUMENTS

| | | | |
|---|---|---|---|
| 7,313,402 B1 * | 12/2007 | Rahman et al. | 455/456.1 |
| 2012/0007779 A1 * | 1/2012 | Klepal et al. | 342/451 |
| 2012/0115475 A1 * | 5/2012 | Miyake et al. | 455/435.1 |

* cited by examiner

*Primary Examiner* — Kashif Siddiqui

(74) *Attorney, Agent, or Firm* — Sughrue Mion, PLLC

(57) ABSTRACT

A method for the construction of commuting matrices using call detail records, computer programs and a use for providing user's mobility information, including computing mechanism for constructing a commuting matrix according to phone call records of a user. The method includes: a) providing a user's origin time range; b) providing a user's destination time range or second user's origin time range; c) constructing the commuting matrix based on call detail records using the user's origin time range and the user's destination time range; d) comparing the commuting matrix with a predetermined ground truth matrix and obtaining a comparison result; and e) optimizing the origin time range and/or destination time range based on the comparison result.

15 Claims, 1 Drawing Sheet

---

Algorithm 1: $CM_{CDR} = CMTAR(CDR, (t_{O,start}, t_{O,end}), (t_{D,start}, t_{D,end}))$

```
CM[O,D]
for each Subscriber S do
    for i = 1, ..., |CDR| do
        if time(CDR_i) ∈ [t_{O,start}, t_{O,end}] then
            O = location(CDR_i)
            for j = i, ..., |CDR within 24h| do
                if time(CDR_j) ∈ [t_{D,start}, t_{D,end}] then
                    D = location(CDR_j)
                    CM(O,D) + +
                end if
            end for
        end if
    end for
end for
for each pair (O_i, D_j) do
    CM[O_i, D_j] = CM(O_i, D_j) / ∑_{j=1}^{j=N} CM(O_i, D_j)
end for
```

Algorithm 1: $CM_{CDR} = CMTAR(CDR, (t_{O.start}, t_{O.end}), (t_{D.start}, t_{D.end}))$

```
CM[O,D]
for each Subscriber S do
    for i = 1, ..., |CDR| do
        if time(CDR_i) ∈ [t_{O.start}, t_{O,end}] then
            O = location(CDR_i)
            for j = i, ..., |CDR within 24h| do
                if time(CDR_j) ∈ [t_{D.start}, t_{D,end}] then
                    D = location(CDR_j)
                    CM(O, D) + +
                end if
            end for
        end if
    end for
for each pair (O_i, D_j) do
    CM[O_i, D_j] = CM(O_i, D_j)/∑_{j=1}^{j=N} CM(O_i, D_j)
end for
```

METHOD AND COMPUTER PROGRAMS FOR THE CONSTRUCTION OF COMMUNTING MATRICES USING CALL DETAIL RECORDS AND A USE FOR PROVIDING USER'S MOBILITY INFORMATION

FIELD OF THE ART

The present invention generally relates, in a first aspect, to a method for the construction of commuting matrices using Phone Call Records, and more particularly to a method to provide alternative cost-effective techniques for the use of Call Detail Records to model behaviors related to commuting patterns.

A second aspect of the present invention relates to computer programs to construct commuting matrices using call detail records.

A third aspect of the present invention relates to a use

A use of a temporal association rules based algorithm (CMTAR) to construct commuting matrices for providing user's mobility information.

By means of ground truth is has to be here understood those data taken from National Statistical Institutes (NSI) and consisting in matrices obtained from periodical surveys asking different segments of the population about their commuting patterns.

PRIOR STATE OF THE ART

Commuting patterns in urban environments are typically represented using commuting matrices, which are traditionally used for transportation design and urban planning. Commuting matrices are a particular case of O-D matrices. O-D matrices characterize the transitions of a population between different geographical regions representing the origin (O) and destination (D) of a route. When building commuting matrices the geographical capture the areas representing origin (O) and destination (D) where people live and work. Typically, O and D are the same set and represent the towns or neighborhoods of the geographical area under study. Each element of the commuting matrix (i, j) defines the percentage of individuals that live in Oi and work in Dj.

Typically, National Statistical Institutes (NSIs) carry out periodical surveys asking different segments of the population about their commuting patterns. The information obtained is used as input for O-D generation techniques. However, such approach typically involves high costs and the data collected has spatio-temporal limitations, which implies that the matrices generated typically only represent a snapshot of the commuting patterns over time.

In recent years, cell phones have become a pervasive technology with users carrying them at almost all times. The ubiquity of these platforms has transformed cell phones into one of the main sensors of human behavior. In fact, every time a subscriber makes or receives a phone call, or an SMS, or an MMS, information regarding the interaction as well as the geolocation of the user (in the form of the tower used for the communication) is logged for billing purposes. As a result, a variety of studies focusing on using cell phone data for estimating traffic and commuting patterns can be found in prior state of the art.

Following this trend, this invention presents the use of the location information contained in Call Detail Records (CDR) as a means to compute, by means of a device with computing capabilities, the commuting patterns of a population expressed as an O-D matrix. As a result, a cost-effective way of obtaining commuting matrices that can be generated as frequently as needed at a fraction of the actual cost is presented.

PROBLEMS WITH EXISTING SOLUTIONS

The construction of O-D matrices has been typically studied by transportation and urban planning research. Traditional solutions are based on questionnaires and/or in the combination of questionnaires with traffic information. Due to the limitations of the data available, such solutions have typically focused on generalization techniques that construct unbiased matrices from partial data.

The main approaches used to obtain traffic data information include video processing or electronic toll collection mechanisms. Nevertheless, these approaches are limited because the information provided only reflects a partial view of the route and because they only gather information from a unique means of transportation. A possible solution for these limitations is the use of GPS data. In this case, the information contains complete routes but the amount of data available is even more limited. In general, the use of GPS data for estimating O-D matrices is not feasible, mainly due to privacy concerns, but also due to the limited scalability of the results caused by the limited amount of data available. These prior studies had done up to now focus mainly on GPS data available from taxi or bus fleets which highly limits the conclusions.

The use of Call Detail Records to model behaviors related to commuting patterns solves to a large extent the previous limitations. A variety of studies can be found in the literature: the work in [2] uses GSM simulated traces to construct origin-destination data to measure the flow of vehicles, [10] presents a model to transform cellular counts into vehicular counts in order to construct commuting matrices, [9] introduced cell phone probes in the network to identify trajectories and estimates O-D matrices using handoffs, and [3] used external O-D matrices to validate the approximation obtained from CDR data.

The approach of the present invention has a set of differential factors with these previous studies:

(1) It uses CDR data that does not contain any handoff information. Handoff information consists on storing the sequence of towers used during a conversation and although they provide more information, cell phone operators do not keep such data due to privacy concerns.

(2) While the state of the art presents techniques to construct O-D matrices and assumes that the quality of the data will imply good results, in the invention case the technique it is proposed uses the information contained in NSI generated O-D matrices to tune the parameters of the method in order to guarantee the quality of the results.

(3) As a result, the invention approach is able to capture the cultural schedules involved with commuting patterns for different urban environments.

Some authors identify the construction of O-D matrices using CDR as the identification of home and work for each user, using that information to aggregate origin-destination patterns. The work in [5], [6] and [3] present algorithms to detect home and work from call detail records by identifying highly used cell-phone towers. Nevertheless the use of such algorithms has strong limitations that affect the construction of O-D matrices, mainly: (1) the error introduced by the algorithms in the estimation of the locations (which in general is not measurable due to the lack of ground truth data); and (2) the fact that the coverage is limited by the availability of information for each user, i.e., home and work can only be detected for individuals that have a minimum amount of interactions with their cell-phone. Depending on the context, this requirement can filter more than 80% of individuals [5], with the corresponding bias in the final matrix. The invention approach does not focus on identifying home and work as a base for constructing an O-D matrix, and as a result, it does not filter individuals that do commute but whose calling frequency does not allow for the identification of home and work.

A patent application US 20120115475 uses data taken from CDRs for population tracking, counting, and movement estimation. This patent application, in order to obtain mobile spatial statistics for tracking a user's mobility uses data from cellular phones. Although it does not consider or hint at changing time range parameters, let alone optimizing them.

Compared to the literature, the invention approach has the following contributions: (1) It bases its study in Call Detail Records, which are already available for billing purposes in a telecommunication operator, and not in specific measurements and/or traces obtained from the cell phone network. It thus shows results based on a big part of a population and not on a limited number of traced cell phones; (2) It presents a new technique for defining and constructing O-D matrices based on a new temporal variation of association rules (TAR, Temporal Association Rules) combined with an optimization process that identifies the best parameters to approximate the original O-D matrix; (3) The inventions technique does not require any number of minimum interactions (phone calls) per user because it is not based on individual users but on aggregated patterns; and (4) it is designed to capture the different cultural commuting schedules of different urban areas.

SUMMARY OF THE INVENTION

The method, computer programs and the use of the present invention are disclosed here to present a mechanism to estimate the commuting matrix of a geographical area from the information contained in call detail records that can approximate the values provided by traditional questionnaire-based approaches.

The present invention relates, in a first aspect, to a method for the construction of commuting matrices using call detail records, comprising as commonly used in the field the following steps:

a) providing a user's origin time range;

b) providing at least a user's destination time range or second user's origin time range;

c) constructing said commuting matrix based on call detail records using said user's origin time range and said user's destination time range.

On contrary to the known proposals, the method of the first aspect further performs following steps:

d) comparing said commuting matrix with a predetermined ground truth matrix and obtaining at least one comparison result therefrom; and e) optimizing at least said origin time range and/or destination time range based on said at least one comparison result.

In an example embodiment, step d) comprises selecting a plurality of geographical regions, said plurality of geographical regions coinciding with the ones considered by corresponding National Statistical Institute (NSI) performing said ground truth matrices. Then, each one of the selected geographical region is assigned to a plurality of base stations included in the geographical region.

In order to construct the commuting matrix, in another embodiment, a temporal association rules based algorithm (CMTAR) is proposed and used.

Moreover, in order to reveal commuting patterns from call detail records the temporal association rules representing the percentage of a plurality of users that are at an origin location $O_i$ during said origin time range and move to a destination location $D_j$ where they are present during said destination time range needs to be identified.

In another embodiment, the origin time range and the destination time range take place no later than 24 hours among them.

In yet another embodiment, step e) comprises the use of a genetic algorithm having a chromosome composed of four different genes in order to perform the optimization of the commuting matrices.

In order to identify the best time intervals each one of the candidate solution generated by the genetic algorithm comprises capturing time intervals at which said plurality of users call from said origin or from said destination location.

Finally, step d) in another embodiment is performed using Pearson's correlation function.

With more accurate commuter matrixes, infrastructure can be planned in advance more efficiently, and regular traffic may be controlled so as to have less traffic problems. Regular traffic would preferably be on a daily basis, but other weekly or season patters, among others, may be estimated. Additionally, coordination of road and pathway signs may be controlled, e.g. traffic lights.

A second aspect of the present invention is related to computer programs. In an embodiment, the computer program includes an algorithm to construct commuting matrices using call detail records according to claim 4. In yet another embodiment, the computer program includes an algorithm such as a genetic algorithm to perform step e) of claim 1.

A third aspect of the present invention is related to a use of the temporal association rules based algorithm (CMTAR) to construct commuting matrices for providing user's mobility information.

BRIEF DESCRIPTION OF THE DRAWINGS

The previous and other advantages and features will be more fully understood from the following detailed description of embodiments, with reference to the attached, which must be considered in an illustrative and non-limiting manner, in which:

FIG. 1 is the CMTAR algorithm used for the construction of an O-D matrix using Temporal Association Rules (TAR), according to an embodiment of the present invention.

DETAILED DESCRIPTION OF SEVERAL EMBODIMENTS

A method and an apparatus are discloses here to provide a technique that makes use of the information extracted from cell phone networks. Cell phone networks are built using base transceiver station (BTS) towers that are in charge of communicating cell phones with the network. A given geographical region will be serviced by a set of BTSs BTS={$bts_1$ ... $bts_N$}, each one characterized by its geographical coordinates (latitude, longitude).

Call Detail Record (CDR) databases are populated whenever a mobile phone makes/receives a call or uses a service (e.g. SMS, MMS). Hence, there is an entry for each interaction with the network, with its associated timestamp and the BTS that handled it, which gives an indication of the geographical location of the mobile phone at a given moment in time. Note that no information about the position of a user within a cell is known. The set of fields typically contained in a CDR include: (a) originating encrypted phone number; (b) destination encrypted phone number; (c) identifier of the BTS that handled the originating phone number (if available); (d) identifier of the BTS that handled the destination phone number (if available); (e) date and time of the call; and (f) duration of the call.

A commuting matrix CM[O,D] represents the percentage of population that commutes on an average daily basis from an origin geographical area O to a destination geographical area D. Typically O and D represent the same set of towns, and as a result a commuting matrix is usually a square matrix. Two commuting matrices can be defined: the home-work commuting matrix CM[H,W] and the work-home commuting matrix CM[W,H]. In the first case, each row of the commuting home-work matrix CM[H,W], $H_i$ represents the percentage of population that lives in geographical area $H_i$ and commutes to each geographical area $W_j$. The diagonal of the matrix expresses the percentage of the population that lives and works in the same town. Symmetrically, the work-home commuting matrix CM[W,H] accounts for the population that works in the geographical area W, and commutes back home to each one of the geographical locations $H_j$ (columns). From this explanation, being N the number of geographical areas considered, it follows that:

$$\sum_{j=1}^{N} CM[H_i, W_j] = 1, \forall i \in [1, \ldots, N] \quad (1)$$

$$\sum_{j=1}^{N} CM[W_i, H_j] = 1, \forall i \in [1, \ldots, N] \quad (2)$$

Traditionally, such commuting matrices are computed by National Statistical Institutes (NSIs) that run surveys and questionnaires across the population under study and determine the commutes that citizens carry out on a daily basis. These mobility matrices are typically available at census bureaus. However, as stated earlier, such surveys are expensive and thus carried out every certain number of years.

The method has two parts: (1) the construction of commuting matrices from CDR data and (2) an optimization process that identifies which behavioral patterns better define commuting when using CDR data.

A. From CDRs to Commuting Matrix:

According to an embodiment, to compute a commuting matrix from CDRs first needs to be identified the geographical areas in the region under study. Given that the goal of this invention is to present an alternative method to generate commuting matrices, for each particular case (home or work) it will select as regions the same ones considered by corresponding NSI. It assigns to each region the set of BTSs geographically included in them (i.e. the towers that give coverage to that area). As a result each geographical area considered $g_i$, i=1, ..., N, with N the total number of geographical areas considered, can be characterized by a set of BTSs $g_i = \{bts_1, \ldots, bts_k\}$.

Once these areas have been characterized, the individuals that called from an origin area at some point in time need to be computed—from the CDRs—and later show calling activity at a destination area. These associations will populate the home-work and work-home commuting matrices.

This problem can be formalized using Association Rules [1]. Association Rules (ARs) were introduced by Agrawal et al. as a technique to discover specific item relationships in itemsets [1]. Specifically, given an itemset $X=X_1, \ldots, X_n$, an Association Rule of the type X→Y implies that whenever X is satisfied, Y is also satisfied and associates a support and confidence values to that rule. Formally, being P the probability of an itemset:

$$\text{support}(X \to Y) = P(X \cup Y) \quad (3)$$

$$\text{Confidence}(X \to Y) = P(Y \mid X) = \frac{P(X \cup Y)}{P(X)} \quad (4)$$

Often times, Association Rules (AR) are used to find the tuples that satisfy minimum support and confidence values in a dataset. ARs are calculated using the Apriori algorithm presented in [1]. In the invention context, association rules are seek $H_i \to W_j$ and $W_i \to H_j$ that identify tuples characterizing the home to work and work to home commutes. Furthermore, these events are required to happen in a temporal order i.e., the home-work matrix CM[H,W] is populated with pairs of events $H_i \to W_j$ such that the interaction at a home location $H_i$ always happens earlier in time than an interaction event at work location $W_j$; analogously, the work-home matrix CM[W,H] is populated with pairs $W_i \to H_j$ where an interaction event at work location $W_i$ always happens before an interaction at a home location $H_j$. Because traditional Association Rules do not consider any order or temporality, a technique designed to capture these elements is presented: Temporal Association Rules (TARs).

Temporal Association Rules extend association rules by introducing temporal constraints in the relationship between antecedent and consequent [4][7]. This invention proposes a new Temporal Association Rule (TARs) where items X and Y are required to happen within a specific time interval. Specifically, each association rule X→Y is characterized not only by its support and confidence, but also by time intervals at which items X and Y need to happen i.e., $X[T_O] \to Y[T_D]$, where $T_O$ is the time interval when the antecedent (or origin O) has to happen and $T_D$ the time interval when consequent (or destination D) has to happen. Also, while in traditional Association Rules, antecedents and consequents can have more than one element, in the invention approach X and Y contain just one element, i.e. one geographical area, indicating the Origin (O) and the Destination (D). In order to reveal commuting patterns from CDRs, the invention seeks to identify the temporal association rules whose confidence represents the percentage of individuals that are at an origin location $O_i$ during a time interval $T_O = [t_{O,start}, t_{O,end}]$ and move to a destination location $D_j$ where they are present during a time interval $T_D = [t_{D,start}, t_{D,end}]$, formally:

$$O_i[t_{O,start}, t_{O,end}] \to D_j[t_{D,start}, t_{D,end}] \quad (5)$$

It can be noted that $t_{O,end}$ happens before $t_{D,start}$. In the invention framework, $O_i$ and $D_j$ represent geographical regions and the temporal association rules will either reveal commuting patterns from home to work locations (with O=home location and D=work location) or work to home commutes (with O=work and D=home).

In order to construct a commuting matrix CM from CDR, CMTAR is proposed, a TAR-based algorithm (see CMTAR Algorithm in FIG. 1) that receives as input a set of CDRs and a pair of time intervals $T_O$ and $T_D$. The algorithm assumes that the set of CDRs are grouped for each subscriber S by date and time, being |CDR| the total number of CDR entries. The algorithm produces as output a Commuting Matrix obtained from CDR records ($CM_{CDR}$) for the corresponding time intervals. CMTAR identifies for each subscriber S within the CDR dataset, all the pairs $O_i \rightarrow D_j$ such that $O_i$ happens within the interval $[t_{O,start}, t_{O,end}]$ and $D_j$ happens no later than 24 hours within the interval $[t_{D,start}, t_{D,end}]$. Each element of the commuting matrix CM [O,D] is populated with the confidence values associated to each Temporal Association Rule (TAR) $O_i \rightarrow D_j$, with i, j=1, ..., N (Equation (4)).

B. Optimizing Time Intervals:

The previous section presented an algorithm, CMTAR, which constructs a Commuting Matrix $CM_{CDR}$ using CDR and a set of time intervals that define the Temporal Association Rules. The problem is how to identify which temporal ranges best capture the behavioral fingerprint for the home-work commuting matrix and the work-home commuting matrix. The objective is to identify the time intervals for the origin and destination of the Temporal Association Rules ($T_O$ and $T_D$) that produce a Commuting Matrix from CDR ($CM_{CDR}$) as similar as possible to the original Commuting Matrix provided by the corresponding National Statistics Institute ($CM_{NSI}$).

A first approach could use brute force to test all possible time intervals, and compute the similarity between $CM_{CDR}$ and $CM_{NSI}$, being the best solution the one with the highest similarity value. However, due to the large amount of CDR data such approach is not computationally feasible, the use of an optimization technique to identify the optimal time intervals that best characterize the commuting patterns is proposed. The invention will present the use of Genetic Algorithms (GA) to implement the optimization process. This technique has been shown to be useful in similar problems and although they are both stochastic, they explore the candidate populations using significantly different approaches.

For each pair of time intervals $T_O$ and $T_D$ that the optimization technique evaluates, first $CM_{CDR}$ need to be computed using the CMTAR algorithm. In order to evaluate its accuracy, we measure the similarity between $CM_{NSI}$ and $CM_{CDR}$. As explained, each row in CMCDR represents the set of confidence values for the corresponding TARs for all commutes departing from each geographical area $O_i$ to any destination location ($O_i \rightarrow D^*$). Similarly, each row in $CM_{NSI}$ represents the confidence of the associated TAR from each geographical area $O_i$ to geographical areas $D^*$. Thus, in order to evaluate the accuracy of $CM_{CDR}$ the similarity of each row with the corresponding row of $CM_{NSI}$ needs to be evaluated. For that purpose, Pearson's correlation [8] is used to analyze the similarity between each origin location $O_i$ in $CM_{CDR}$ with $CM_{NSI}$ and the final similarity value is given by the average Pearson correlation across all origins. Formally the similarity between $CM_{NSI}$ and $CM_{CDR}$ is obtained as:

$$c(O_i) = \text{Pearson}(CM_{CDR}[O_i, D^*], CM_{NSI}[O_i, D^*], i = 1, \ldots, N \quad (6)$$

$$\text{similarity} = \sum_{i=1}^{N} |c(O_i)|/N$$

Genetic Algorithms (GA) are search algorithms based on the mechanics of natural selection tailored for vast and complex search spaces. A GA starts with a population of abstract representations (called chromosomes) of candidate solutions (individuals) that evolves towards an improved set of solutions. A chromosome is composed of several genes that code the value of a specific variable of the solution. Each gene is typically represented as a string of 0s and 1s. During the evolution, individuals from one generation are used to form a new generation, which is (hopefully) closer to the optimal solution. GAs uses a fitness function in order to evaluate the quality of the solution represented by a specific individual. In each generation, GA creates a new set of individuals obtained from recombining the fittest solutions of the previous generation (crossover), occasionally adding random new data (mutation) to prevent the population from stagnating. This generational evolution is repeated until some condition (for example number of populations or improvement of the best solution) is satisfied.

In the context of identifying the best time intervals for constructing $CM_{CDR}$, GA takes as input the set of phone calls (CDRs) from a geographical region and $CM_{NSI}$ that defines the optimization objective. Each candidate solution produced by GA is designed to capture the time intervals at which commuters call from origin and destination locations. In order to do that, we define a chromosome composed of four different genes. The first two genes represent the starting time and the finishing time at which subscribers make phone calls from the origin locations O. The last two genes represent the starting time and the finishing time at which subscribers make phone calls from destination locations D. Each gene is composed of five bits, which accounts for the 24 hours of the day. Given that, $[t_{O,start}, t_{O,end}]$ are required to happen before $[t_{D,start}, t_{D,end}]$, whenever the newly computed chromosomes does not satisfy this restriction, $T_O$ is assumed to happen the natural day before $T_D$.

The fitness of each candidate solution is evaluated using Equation (6), i.e. the fitness function as the accuracy of the mobility matrix $CM_{CDR}$ with respect to the NSI mobility matrix, $CM_{NSI}$ is defined. As a first step to evaluate the fitness of a candidate solution, $CM_{CDR}$ has to be generated using CMTAR algorithm with the time slots defined by the genes of the candidate solution. For example, if a candidate solution proposed by the GA has the values [(06,09),(17,22)], CMTAR computes the temporal association rules $O_i \rightarrow D_j$ that represent calls made or received at location $O_i$ during a morning interval (6 am to 9 am) and at location $D_j$ during a night period (5 pm to 10 pm). The confidence values are then used to generate $CM_{CDR}$, whose fitness is evaluated using $CM_{NSI}$ with Equation (6).

ADVANTAGES OF THE INVENTION

Traditional methods for the estimation of mobility matrices suffer from a variety of limitations, mainly the bias of the information collected and the cost of gathering such information. To overcome these issues, the present invention has presented a method based on the data collected by cell phone infrastructures to generate commuting matrices. In the literature it can be found similar approaches, but in this case the study has been focused on showing that it can replicate the information contained in questionnaire-based O-D matrices. The invention approach is implemented with CMTAR, a TAR-based algorithm designed to construct commuting matrices from CDR data.

The combination of CMTAR with optimization techniques provides an approach that identifies which parameters need to be used to construct commuting matrices from CDR that are as similar as possible to the original NSI matrices. The method computes commuting matrices without the need of collecting survey information, which as a result provides a cost efficient tool to generate O-D matrices as frequently as needed.

The method here presented solves the limitations that previous approaches have, mainly:
(1) It does not need the use of questionnaires or on-site data collection for capturing the information, which lowers the cost for obtaining the results.
(2) Commuting matrices can be identified as frequently as needed, which is especially useful for study the evolution of commuting over time (for example each month, instead of generating one matrix per year)
(3) Commuting patterns can be identified for different groups of individuals, i.e. elders, young, socio-economic divisions or tourists. The main difference in the method consists on filtering the original CDR database to consider only the entries that are done by the group in which the study focuses.

Potential Uses of the Invention

The result of the method of the present invention identifies which values of $T_O$ and $T_D$ better approximate $CM_{CDR}$ to $CM_{NSI}$. These values are needed to automatically generate a Commuting Matrix (CM) from CDR data.

An application of the method would consider the following scenario:
(1) A public entity, such as city hall or the local NSI, generates periodically (typically every year) a CM, which implies hiring a company to run the questionnaires, gather the information, aggregate it and generate the CM.
(2) In order to reduce costs and increase the frequency of the generation of a CM and in order to produce better and more frequent planning, the public institution is in search of other providers.
(3) A telecommunication company can provide this service using the method here presented:
   a. The public entity gives the telecommunication company the CM of the previous period ($CM_{NSI}$)
   b. The telecommunication company gathers the CDR for the corresponding geographical area and the corresponding period.
   c. The application of the two step method presented in this patent identifies $T_O$ and $T_D$.
   d. The telecommunication company gathers CDR for the new period for which the public institution wants the CM to be generated. Using $T_O$ and $T_D$, the CMTAR Algorithm (FIG. 1) and the CDR gathered, the telecommunication company generates the new CM ($CM_{CDR}$) for the new period.
   e. Section d. can be run as many times as needed, for example each month, instead of each year as it is typically done.

As a result, telecommunication companies can present themselves as providers of mobility information in the form of a commuting matrix for public institutions. Commuting matrices are relevant for a variety of transport applications, such estimation of traffic or the design of public transport routes.

The method presented provides and alternative cost-effective techniques for the construction of commuting matrices from CDR data. The method complements traditional approaches to generate commuting matrices, and allows for example to generate commuting matrices each month to study the variations or focused on specific parts of the population to cater to their needs.

A person skilled in the art could introduce changes and modifications in the embodiments described without departing from the scope of the invention as it is defined in the attached claims.

ACRONYMS

AR Association Rule
BTS Base Transceiver Station
CDR Call Detail Records
CM Commuting Matrix
CMCDR Commuting Matrix generated from CDR data
CMNSI Commuting Matrix obtained by the National Statistical Institute
CMTAR Commuting Matrix-Temporal Association Rule Algorithm
D Destination
GA Genetic Algorithm
H Home
MMS Multimedia Messaging System
NSI National Statistical Institute
O Origin
O-D Origin-Destination
SMS Short Message Service
TAR Temporal Association Rules
TD Time at Destination
TO Time at Origin
W Work

REFERENCES

[1] Agrawal, R., Imielinski, T., Swami, A. N. Mining association rules between sets of items in large databases. In Proceedings of the 1993 ACM SIGMOD International Conference on Management of Data, pages 207-216, 1993.
[2] B. F. Caceres N., Wideberg J. P. Deriving origin destination data from a mobile phone network. Intelligent Transport Systems, IET, 1(1):15-26, 2007.
[3] Calabrese F., Di Lorenzo G., Liu L., Ratti C. Estimating origin-destination flows using mobile phone location data. IEEE Pervasive Computing 10(4), pages 36-44, 2011.
[4] Frias-Martinez, E. and Karamchety, V. A Customizable Behavior Model for Temporal Prediction of Web User Access Sequences. In LNAI 2703, page, 2003.
[5] Frias-Martinez, V. and Virseda, J. and Rubio, A. and Frias-Martinez, E. Towards large scale technology impact analyses: Automatic residential localization from mobile phone-call data. In Int. Conf. on Inf. & Comm. Technologies and Development (ICTD), 2010.
[6] Isaacman, S. and Becker, R. and Cáceres, R. and Kobourov, S. and Martonosi, M. and Rowland, J. and Varshaysky, A. Identifying important places in peoples lives from cellular network data. Pervasive Computing, pages 133-151, 2011.
[7] Mannila H., Toivonen H., Inkeri Verkamo A. Discovery of Frequent Episodes in Event Sequences. Data Mining and Knowledge Discovery, 3(1):259-289, 1997.
[8] J. Rodgers and W. Nicewander. Thirteen ways to look at the correlation coefficient. American Statistician, pages 59-66, 1988.
[9] K. Sohn and D. Kim. Dynamic origin-destination flow estimation using cellular communication system. Vehicular Technology, IEEE Transactions on, 57(5):2703-2713, 2008.
[10] Zhang Y., Qin X., Dong S., Ran B. Daily O-D Matrix estimation using cellular probe data. In 89th Annual Meeting Transportation Research Board, 2010.

The invention claimed is:

1. A method for the construction of commuting matrices using call detail records, comprising using a computer to construct a commuting matrix according to phone call records of a user, said method comprising:
   a) providing a user's origin time range;
   b) providing at least a user's destination time range or second user's origin time range;
   c) constructing said commuting matrix based on call detail records using said user's origin time range and said user's destination time range;
   d) comparing said commuting matrix with a predetermined ground truth matrix and obtaining at least one comparison result therefrom; and
   e) optimizing at least said origin time range and/or destination time range based on said at least one comparison result.

2. The method according to claim 1, wherein said d) comprises selecting a plurality of geographical regions, said plurality of geographical regions coinciding with the ones considered by corresponding National Statistical Institutes (NSI) performing said ground truth matrices.

3. The method according to claim 2, comprising assigning each one of said selected geographical regions to a plurality of base stations included in said geographical region.

4. The method according to claim 1, comprising constructing said commuting matrix from Call Detail Records using a temporal association rules based algorithm (CMTAR).

5. The method according to claim 4, further comprising identifying said temporal association rules representing the percentage of a plurality of users that are at an origin location $O_i$ during said origin time range and move to a destination location $D_j$ where they are present during said destination time range.

6. The method according to claim 1, wherein said origin time range and said destination time range take place no later than 24 hours among them.

7. The method according to claim 5, wherein said e) comprises using a genetic algorithm.

8. The method according to claim 7, wherein each one of a candidate solution generated by said genetic algorithm comprises capturing time intervals at which said plurality of users call from said origin or from said destination location.

9. The method according to claim 8, wherein said genetic algorithm comprises a chromosome having four different genes.

10. The method according to claim 1, comprising performing said d) using Pearson's correlation function.

11. The method according to claim 1, further comprising controlling traffic infrastructure based on output parameters from said commuting matrices.

12. A non-transitory computer readable medium storing a program causing a computer to execute method for constructing a commuting matrix according to phone call records of a user, said method comprising:
   a) providing a user's origin time range;
   b) providing at least a user's destination time range or second user's origin time range;
   c) constructing said commuting matrix based on call detail records using said user's origin time range and said user's destination time range;
   d) comparing said commuting matrix with a predetermined ground truth matrix and obtaining at least one comparison result therefrom; and
   e) optimizing at least said origin time range and/or destination time range based on said at least one comparison result.

13. The non-transitory computer readable medium according to claim 12, wherein the method further comprises constructing said commuting matrix from Call Detail Records using a temporal association rules based algorithm (CMTAR).

14. The non-transitory computer readable medium according to claim 13, wherein said algorithm is a genetic algorithm.

15. The non-transitory computer readable medium according to claim 13, the method further comprising using said CMTAR to model behaviors related to commuting patterns by constructing said commuting matrix according to location data extracted from said phone call records of said user, for design of transport routes and/or estimation of traffic.

* * * * *